(12) United States Patent
Okumura et al.

(10) Patent No.: US 6,610,438 B2
(45) Date of Patent: Aug. 26, 2003

(54) SEAL TYPE STORAGE BATTERY

(75) Inventors: Nobuhito Okumura, Hyogo (JP); Satoru Nishimura, Hyogo (JP); Takuya Tamagawa, Hyogo (JP); Hisashi Kakiuchi, Hyogo (JP); Hiroki Katayama, Hyogo (JP); Hiroyuki Inoue, Hyogo (JP); Etsuya Fujisaka, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 76 days.

(21) Appl. No.: 09/820,353

(22) Filed: Mar. 29, 2001

(65) Prior Publication Data

US 2001/0038940 A1 Nov. 8, 2001

(30) Foreign Application Priority Data

Mar. 30, 2000 (JP) .................................... 2000-094296
Mar. 12, 2001 (JP) .................................... 2001-068336

(51) Int. Cl.[7] ........................ H01M 10/34; H01M 10/44
(52) U.S. Cl. .............................. 429/61; 429/7; 429/54; 429/90
(58) Field of Search ........................ 429/61, 7, 90, 429/54

(56) References Cited

U.S. PATENT DOCUMENTS 6,248,470 B1 * 6/2001 Azema et al. ................. 429/61
6,287,718 B1 * 9/2001 Azema ........................... 429/61

FOREIGN PATENT DOCUMENTS

| DE | 1263 149 | 1/1964 |
| GB | 2 058 456 | 4/1981 |
| JP | 5-36442 | 2/1993 |
| JP | 5-290897 | * 5/1993 |
| JP | 5-153734 | 6/1993 |

OTHER PUBLICATIONS

Patent Abstracts of Japan, vol. 012, No. 038 (E–580), Feb. 4, 1988, by Koike Kiichi, entitled "Sealed Lead–Acid Battery".

* cited by examiner

*Primary Examiner*—John S. Maples
(74) *Attorney, Agent, or Firm*—Wenderoth, Lind & Ponack, L.L.P.

(57) ABSTRACT

A seal type storage battery has a battery case which has a sealing assembly for sealing an opened portion of an outer case, which holds an electricity generating element. The sealing assembly includes a pressure-sensitive conductive rubber member in the battery case. The pressure-sensitive conductive rubber member has a resistance that changes continuously depending on a rise of inner pressure in the battery case. A lead connecting with the, pressure-sensitive conductive rubber extends outside of the battery case, and the lead is capable of outputting a pressure detecting signal to outside.

21 Claims, 8 Drawing Sheets

SEAL TYPE STORAGE BATTERY

This application is based on applications No. 94296 filed in Japan on Mar. 30, 2000 and No. 68336 filed in Japan on Mar. 12, 2001, the content of which incorporated hereinto by reference.

BACKGROUND OF THE INVENTION

This invention relates to a seal type storage battery such as a nickel-cadmium storage battery, a nickel metal hydride type storage battery or the like, in particular, an improve seal type storage battery having a pressure detector for detecting inner pressure of the battery.

A seal type storage battery such as a nickel-cadmium seal type storage battery, a nickel metal hydride storage battery or the like produces oxygen gas at a positive electrode when close to charge up, and in some cases hydrogen gas is produced at a negative electrode, thereby increasing the inner pressure of the battery. For this reason, this kind of battery has a relief valve, which exhausts the gas out of the battery when the inner pressure exceeds a predetermined pressure, and the valve closes when the inner pressure is lower than the predetermined pressure.

In this case, a decrease of battery capacity occurs due to a decrease of electrolyte in accordance with the process of charge-discharge cycles. Therefore, various charging methods for preventing overcharge are employed. For example, a so-called—delta-V method is employed to control the charge by detecting decreased voltage delta-V from a peak point in accordance with a phenomenon in which charged voltage shows the peak point at the end of charging. A method has also been employed that controls the charge by detecting surface temperature of the battery in accordance with the phenomenon that the surface temperature increases with the process of the charge.

However the charged voltage depends on charging current or ambient temperature, so that the—delta-V method described above has a problem in that dispersion of the detected delta-V value occurs at overcharge. On the other hand, the method that controls the charge by detecting the surface temperature of the battery, described above, can detect the difference of the temperature comparatively with accuracy when the charging current is small, but the temperature in short time charging increases quickly so that the method has the problem that an overcharge can occur due to a delay in detecting the increasing temperature.

Therefore, a method was proposed that controls the charge by detecting a rise of inner pressure of the battery due to the charge, for example in Japanese Laid-Open Patent Publication No. TOKU-KAI-HEI 5-153,734 (1993), Japanese Laid-Open Patent Publication No. TOKU-KAI-HEI 5-36,442 (1993) etc. However, in the method proposed in Japanese Laid-Open Patent Publication No. TOKU-KAI-HEI 5-153,734 (1993), a strain gauge is attached to the battery with adhesive to detect the inner pressure, and then deformation of the battery case is converted into variation of resistance so that charging is controlled by detecting the variation of resistance. In this case, it has a problem in that it cannot sufficiently prevent overcharge, since it cannot detect the inner pressure directly so that detection of the inner pressure is delayed, and sensitivity of the detection depends on the condition of the attachment of the strain gauge so that it cannot detect the inner pressure with certainty.

On the other hand, in the method proposed in Japanese Patent Application HEI 5-3644, 1993, it has a problem in that it cannot be used repeatedly when it cuts the charging current directly when charging with a huge amount of charging current, since a detection signal detected by a pressure detector controls a switching device, disposed in a charging circuit, to cut the charging current directly so that the switching device is susceptible to being broken. In addition, it is difficult to ensure that the pressure detector disposed in the trough will operate stably for a long time, so that it makes it difficult to detect its inner pressure with accuracy to protect the battery effectively. The detector is disposed under very extreme circumstances such as large variations of pressure or temperature, so that the detector is susceptible to aging. Further, the detector is exposed to electrolyte, which causes leakage.

Therefore, in order to solve the problems mentioned above, the object of the present invention is to provide a seal type storage battery that can detect the inner pressure of the battery caused by direct charging to prevent the occurrence of an overcharge.

SUMMARY OF INVENTION

To achieve the objects mentioned above, the seal type storage battery of this invention has a pressure-sensitive conductive rubber whose resistance changes continuously depending on a rise of inner pressure in the battery case. The conductive rubber is disposed in the battery case, and a lead connecting with the pressure-sensitive conductive rubber is extended to outside of the battery case. The lead which is extended to outside of the battery case, outputs a pressure detecting signal.

Since the seal type storage battery has the pressure-sensitive conductive rubber whose resistance is changed continuously depending on the rise of inner pressure of a battery case so that the detection does not delay because the inner pressure can be immediately output as the detecting signal. In addition, the pressure-sensitive conductive rubber detecting the pressure has superior resistance for transmutation of pressure and temperature so that the structure can prevent its aging. Further, as shown in FIG. 4, the pressure-sensitive conductive rubber has a characteristic that its resistivity changes in accordance with load (pressure) so that it can detect a rise of the inner pressure with accuracy. Especially, the resistitvity is extremely sensitive in the early stage at which load operates, so that the increasing inner pressure can be detected more precisely. Further, the pressure-sensitive conductive rubber shows a superior water-proof quality such that it can effectively prevent the degradation caused by the electrolyte. Accordingly, the seal type storage battery according to the present invention can detect the inner pressure of the battery with accuracy and immediacy using the pressure-sensitive conductive rubber. Thus, overcharging can be prevented for this type of battery over a long period of time with certainty. Furthermore, the seal type storage battery has a lead connected with the pressure-sensitive conductive rubber. The lead is disposed in the battery case and extended to the outside, so that simply connecting the extended lead with the control circuit of the charging circuit can cut the charging current, thus facilitating the connecting work between the seal type storage battery and charging circuit.

In this case, the seal type storage battery according to the present invention has a sealing equipment or assembly which has a sealing sheet having an opened hole in the center. The sealing assembly seals an open hole of the outer case via an insulative gasket and an electrode cap fixed on the outer surface of the sealing sheet. An alkali-resisting rubber sheet is disposed between the sealing sheet and the electrode cap, wherein the pressure-sensitive conductive rubber is disposed at the position of the opened hole of the sealing sheet and is sandwiched between the alkali-resisting rubber sheet and the electrode cap, so that the pressure due to gas produced in the battery can be transmitted to the pressure-sensitive conductive rubber via the alkali-resisting rubber. Therefore the gas pressure produced in the battery can be instantly transmitted to the pressure-sensitive conductive rubber immediately, and then output to the outside as an electrical signal via the lead connected to the pressure-sensitive conductive rubber.

Thereby, the seal type storage battery connected with the charging circuit can prevent overcharge, since the lead connected to the pressure-sensitive conductive rubber connects with the control circuit of the charging circuit so that the charging current can be cut immediately when the inner pressure of the battery exceeds a predetermined pressure value. In addition, even the sealing sheet has an open hole in the center of it, and the alkali-resisting rubber seals the open hole so that the internal battery is maintained in an airtight condition, and therefore the pressure-sensitive conductive rubber is not exposed to the alkali-condition of the internal battery.

In addition, the seal type storage battery may have a pressure-regulating valve assembly disposed between the sealing sheet, which is a component of the sealing equipment, and the electrode cap. The pressure-regulating valve equipment comprises a valve sealing the open hole portion of the sealing sheet and an elastic body biasing the valve to the open hole. In the valve, the pressure-sensitive conductive rubber is disposed in a position facing the open hole portion of the sheet via an alkali-resisting rubber. The seal type storage battery can cut the charge current immediately by detecting a rise of the inner pressure of the battery with the pressure-sensitive conductive rubber disposed inside of the valve. Further, in the seal type storage battery, the pressure-regulating valve can exhaust the gas in the battery case to the outside by opening the valve instantly, even if the charge current cannot be cut immediately in response to an increase of the inner pressure because of an error at the pressure-sensitive conductive rubber.

Furthermore, the seal type storage battery may seal the open portion of the outer case with the sealing sheet via a insulative gasket.

The above and further objects and features of the invention will more fully be apparent from the following detailed description in conjunction with the accompanying drawings.

DETAILED DESCRIPTION OF THE INVENTION

Figure 1:
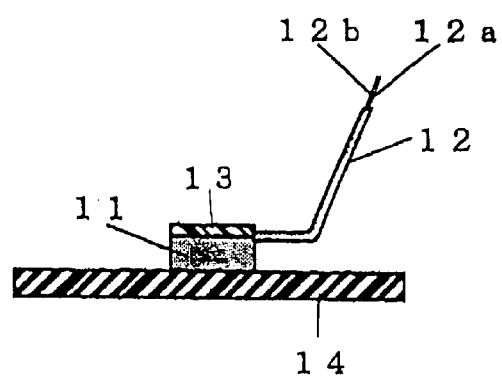
FIG. 1 shows a cross sectional view of the process for producing the sealing equipment of the present invention, which has the pressure-sensitive conductive rubber
Figure 2:
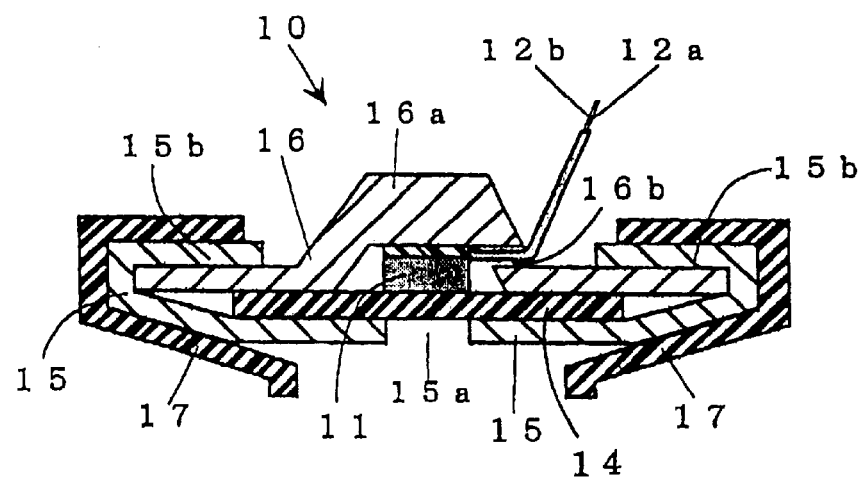
FIG. 2 shows a cross sectional view of the finished sealing equipment of the present invention, which has having the pressure-sensitive conductive rubber.
Figure 3:
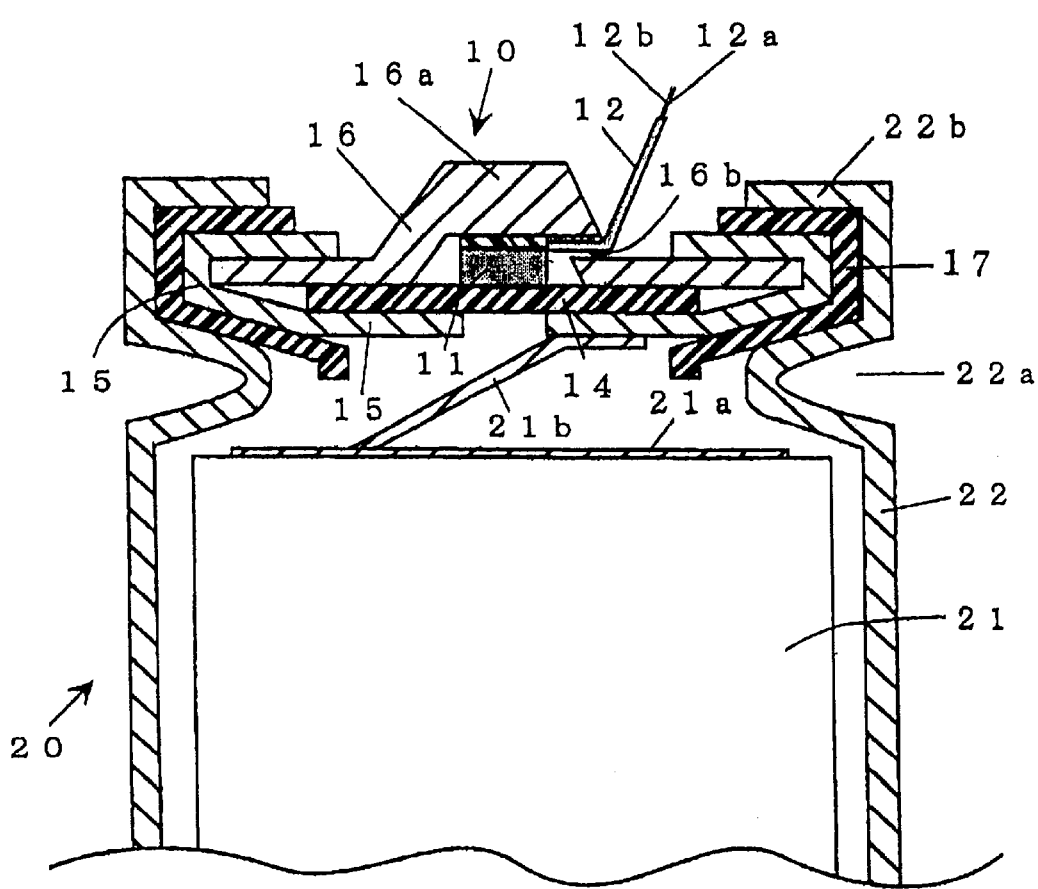
FIG. 3 shows a partial cross sectional view of the main part of a nickel-cadmium storage battery having the seal equipment of FIG. 2.

An embodiment of the present invention applied to a nickel-cadmium seal type storage battery, is described in conjunction with FIG. 1–FIG. 3 below. FIG.1 shows a cross sectional view of the process to produce the sealing equipment of the present invention having the pressure-sensitive conductive rubber, FIG. 2 shows a cross sectional view of the finished sealing equipment of the present invention having the pressure-sensitive conductive rubber, and FIG. 3 shows a partial cross sectional view of the main part of the nickel-cadmium storage battery having the sealing equipment of FIG. 2.

1. Producing the Sealing Equipment

Figure 4:
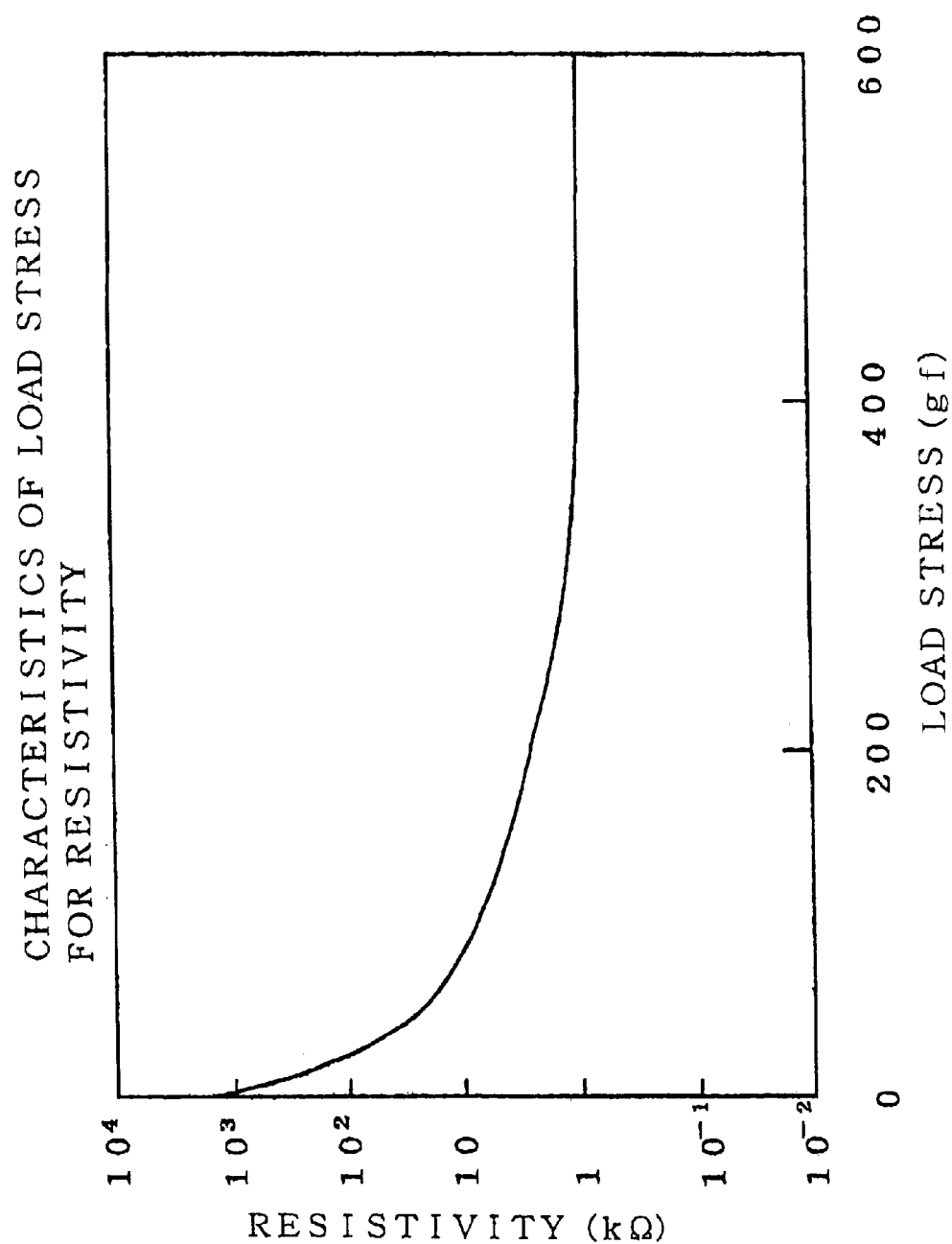
FIG. 4 shows the relationship of the pressure-sensitive conductive rubber of the present invention between compression pressure (load stress) and resistivity.

A pressure sensor is produced by preparing a lead 12 having a pressure-sensitive conductive rubber 11(for example, Inastmar manufactured by Inaba Rubber Inc.), covering one side of the pressure-sensitive conductive rubber 11, joined to the lead 12, with an insulative sheet 13, attaching an alkali-resisting rubber (for example ethylene-propylene diethylene rubber (EPDM)) sheet 14 to the other side of the pressure-sensitive conductive rubber that is not joined to the lead 12. The pressure-sensitive conductive rubber 11 is mainly made of a pressure-sensitive conductive material having the characteristics that its resistivity decreased in accordance with the increase of the pressure (load stress) as shown in FIG. 4. Also, at one end of the lead 12, a pair of core wires 12a, 12b is exposed.

The next steps include, preparing a sealing sheet 15 with an opened hole 15a in the center, and an electrode cap 16 having a projection 16a in the center with a pierced hole 16b at its bottom, then disposing the pressure-sensor described above between the sealing sheet 15 and the electrode cap 16. In the battery of this embodiment, the electrode cap 16 is a positive electrode. In this case, after the lead 12 of pressure-sensor is inserted into the pierced hole 16b of the electrode cap 16, the pressure-sensitive conductive rubber 11 is positioned at the opened hole 15a of the sealing sheet 15. Subsequently, the pressure-sensitive conductive rubber 11 is sandwiched between the sealing sheet 15 via the alkali-resisting rubber sheet 14 and the electrode cap 16 by caulking the periphery 15b of the sealing sheet 15 by bending. As described above, the pressure-sensitive conductive rubber 11, which is sandwiched between the sealing sheet 15 and the electrode cap 16, has the advantage that it can be located at a predetermined position with certainty. Further, since the pressure-sensitive conductive rubber 11 is disposed such that the opposite side of the surface facing the opened hole 15a is in surface contact with the electrode cap 16, the electrode cap 16 can firmly receive the load applied to the surface facing the opened hole 15a and detect the pressure with accuracy. Next, producing a sealing equipment or assembly 10 by attaching an insulative gasket 17 around the caulked portion of the sealing sheet 15.

2. Producing the Nickel-Cadmium Storage Battery

The process includes applying positive activating material slurry having a positive activating material mainly made of nickel hydroxide and adhesive on both sides of a core plate made of a punching metal, after drying, producing a nickel positive electrode plate by cutting it into a predetermined form. In addition, the process includes applying negative activating material slurry having a negative activating material mainly made of cadmium oxide and adhesive on both sides of a core plate made of a punching metal, after drying, producing a cadmium negative electrode plate by cutting it into a predetermined form.

Next, producing a rolled electrode agglomerate 21 by rolling the nickel positive electrode and the cadmium negative electrode with a separator between in a roll shape, then welding a positive collector 21a onto the positive core plate exposed at the upper surface of the rolled electrode agglomerate 21, and welding a negative collector (not shown) onto the negative core plate exposed at the lower surface of the rolled electrode agglomerate 21. Next, disposing the rolled electrode agglomerate 21 in an outer case 22 formed in a drum shape having a bottom (the outside of the bottom is a negative electrode terminal) made of iron with nickel plating.

The process then includes spot-welding a positive collector lead 21b extended from the positive collector 21a to the bottom of the sealing sheet 15 of the sealing equipment 10 described above. Next, after forming a circular groove portion 22a by drawing in the upper outline part of the outer case 22, attaching the sealing equipment 10 in an opened portion of the outer case 22 by disposing the insulative gasket 17 onto the circular groove portion 22a. Next, producing the nickel-cadmium storage battery 20 by caulking the opened edge portion 22b of the outer case 22 inwardly to seal the battery.

3. Connecting with the Charging Circuit.

Figure 5:
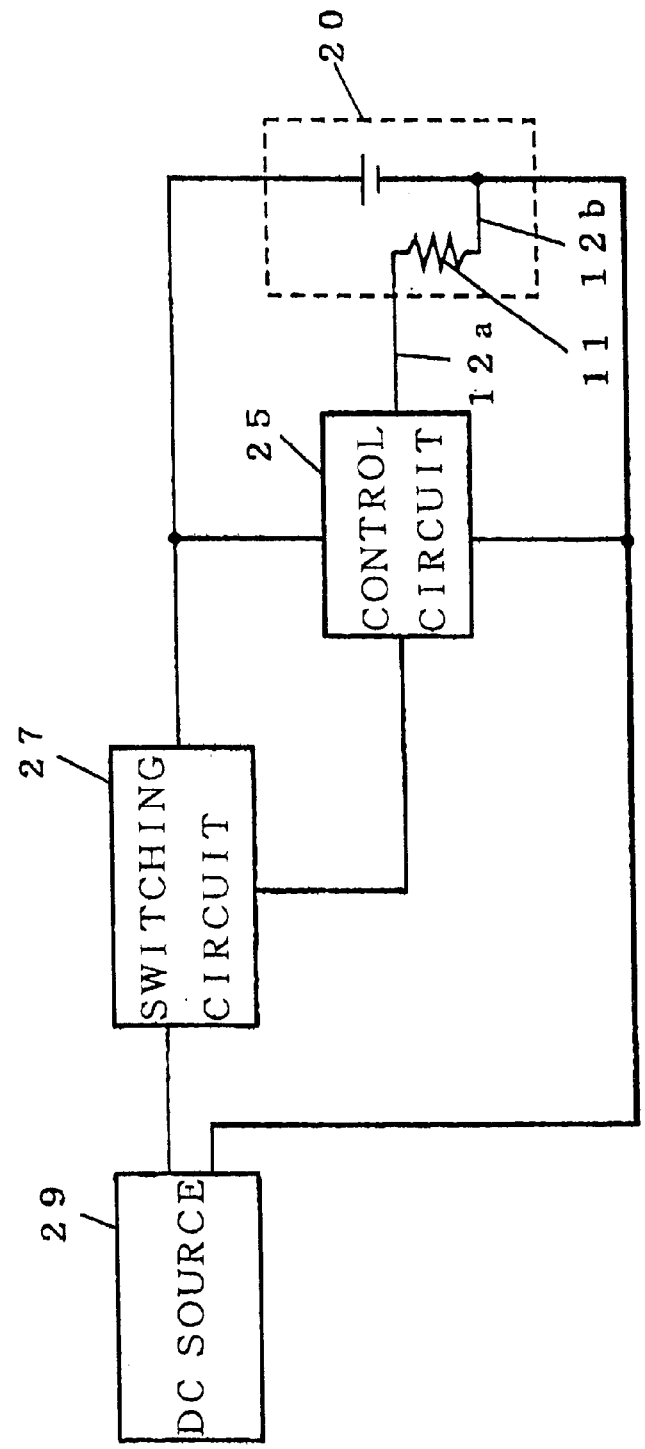
FIG. 5 shows a block diagram of the charging circuit for the seal type storage battery according to the present invention.

Next, a process of connecting the nickel-cadmium storage battery 20, produced as described above, with a charging circuit is described in conjunction with FIG. 5 below.

The charging circuit has a DC source 29(also the DC source can be used as a current source commutating an AC source) for providing the charging current to the nickel-cadmium storage battery 20, a switching circuit 27 for applying or cutting the current source 29 to the nickel-cadmium storage battery 20, and a control circuit 25 for judging whether the inner pressure of the nickel-cadmium battery 20 is higher than a predetermined threshold or not and outputting a cutting signal to the switching circuit 27 when the inner pressure is higher than the threshold value. The switching circuit 27 may be as a semiconductor switching device such as a transistor or FET or the like. The switching circuit 27 makes contact with AC current or cuts the AC current in accordance with an On or Off signal provided from the control circuit 25. The switching device applied to the semiconductor switching device can be used for a long period of time stably without breakdown even when used repeatedly with high-current. This is because the semiconductor switching device will not break due to the On and Off switching operation, which differs from a switching device having mechanical contact.

When the nickel-cadmium storage battery 20 is connected with the charging circuit described above, the positive side of the DC source is connected with the projection (positive terminal) 16a of the electrode cap 16 of the nickel-cadmium storage battery 20 via the switching circuit, and the negative side of the DC source is connected with the bottom (negative terminal) of the outer case 22. On the other hand, control circuit 25 is connected with one core wire 12a of lead wire 12 which connects with the pressure-sensitive conductive rubber 11 and is extended from the pierced hole 16b of the electrode cap 16 to outside of the battery. The other core wire 12b is connected with connecting portion of the DC source 20 and the negative electrode of the battery 20. Thereby, the battery 20 is connected with the charging circuit.

4. Charge Operation

Next, the operation of the charging circuit, connected with the storage battery 20 as mentioned above, is described below. First, switching on a DC source switch (not shown) places the switching circuit 27 in an ON state, then the DC source 29 provides a charging current (constant current) to the battery 20. By keeping the charging current constant, the charged voltage rises, and when close to the end of the charging period, the inner pressure rises due to gas produced in the battery. When the inner pressure rises, the resisitivity of the pressure-sensitive rubber 11 drops as shown in FIG. 4.

Thereby, the voltage value through the pressure-sensitive rubber 11 decreases. The control circuit 25 does not output the detecting signal when the voltage value is higher than the predetermined threshold so that charging is continued. The detecting signal is output to the switching circuit 27 when the voltage value is lower than the threshold value. Therefore, the switching circuit 27 is in an OFF state so that the charging current is not provided to the battery 20. Accordingly, overcharge of the battery 20 is prevented.

5. Another embodiment

Figure 6:
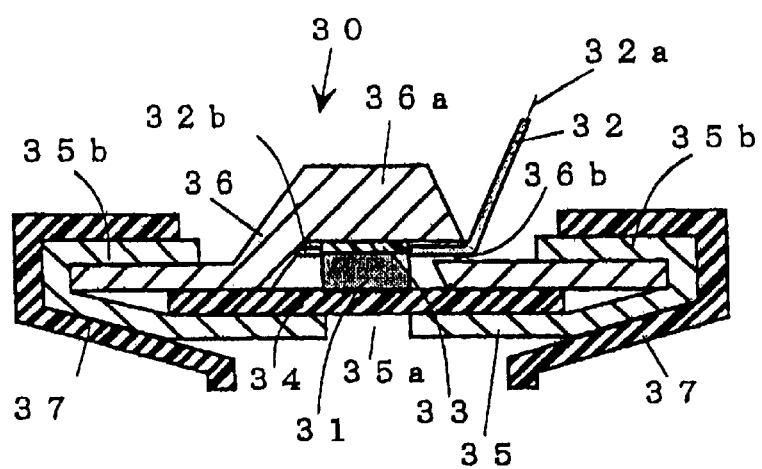
FIG. 6 shows a cross sectional view of the finished sealing equipment of another embodiment having the pressure-sensitive conductive rubber.

Although it is explained that the above-described embodiment has the pressure-sensitive conductive rubber 11 sandwiched between the sealing sheet 15 via the alkali-resisting rubber 14 and the electrode cap 16, the pressure-sensitive conductive rubber can be disposed on the negative electrode side. In this case, as shown in FIG. 6, an insulative sheet 33 covers one side of a pressure-sensitive conductive rubber 31 joined to a lead 32, and an alkali-resisting rubber sheet 34 is attached to the other side of the pressure-sensitive rubber which is not joined to the lead 32, thereby producing a pressure-sensor. Next, the pressure sensor is disposed between a sealing sheet 35 and a electrode cap 36. In this sealing equipment or assembly 30, the electrode cap 36 is described as a negative electrode.

In this case, the assembly is formed by inserting one a core wire 32a of the lead 32, which his extended from the pressure-sensitive rubber 31 into the pierced hole 36b of the electrode cap 36, and disposing the pressure-sensitive conductive rubber 31 at an opened hole 35a of the sealing sheet 35 after welding the other core wire 32b to the bottom of the projection 36a of the electrode cap 36. Subsequently, the pressure-sensitive conductive rubber 31 is sandwiched between sealing sheet 35 via the alkali-resisting rubber 34 and the electrode cap 36 by caulking the periphery 35b of the sealing sheet 35 by bending. Next, a sealing equipment 30 is produced by attaching an insulative gasket 37 around the caulked portion of the sealing sheet 35.

Next, welding a negative collector onto a rolled electrode agglomerate produced the same as described above, and welding a positive collector onto the lower surface of the rolled electrode agglomerate, then, disposing the rolled electrode agglomerate in a cylindrical shaped and bottom closed outer case made of iron with nickel plating (in this case, the outer surface of the bottom is a positive electrode terminal). Then, spot-welding a positive collector lead, extended from the negative collector, to the bottom of the sealing sheet 35 of the sealing equipment 30, after forming a drawn portion by drawing to the upper outline part of the outer case, attaching the sealing equipment in an opened portion of the outer case by disposing the insulative gasket 37 onto the drawn portion. Next, producing the nickel-cadmium storage battery by sealing the battery by caulking the opened edge portion of the outer case toward the inside.

In another embodiment of the nickel-cadmium storage battery, the other side of the core wire 32b of the lead 32 extended from the pressure-sensitive rubber 31 is welded to the bottom of the projection of the electrode cap 36, so that the lead connected to the control circuit 25 (See FIG. 5) of the charging circuit is only the one side of core wire 32a, thus making the connecting work easier.

Also, the sealing equipment 30 described above can be disposed in the bottom of the cylindrical outer case and a conventional sealing equipment can be disposed in the top of the outer case. In this case, the conventional sealing equipment has a structure that has a pressure-regulating valve having a valve to shut a hole for exhaust formed in center of a sealing sheet and a spring to bias the valve, between the sealing sheet and an electrode cap which is a positive electrode. Thus disposing the conventional sealing equipment, the pressure-regulating valve can work even if the pressure-sensitive conductive rubber 31 disposed in the sealing equipment 30 is not in operation, so that the safety of the battery is further improved.

As described above, according to the prevent invention the seal type storage battery has an alkali-resisting rubber sheet 14(34) between a sealing sheet 15(35) and an electrode cap 16(36), wherein a pressure-sensitive conductive rubber 11 (31) is disposed in position of an opened hole 15a(35a), which is an opened hole portion in the sealing sheet 15(35) and sandwiched between the alkali-resisting rubber sheet 14(34) and the electrode cap 16(36), so that the pressure due to gas produced in the battery can convey to the pressure-sensitive conductive rubber 11(31) via the alkali-resisting rubber 14(34). Therefore the gas pressure produced in the battery can be conveyed immediately, and then it is instantly output as an electrical signal via a lead wire 12(32), which is a lead, connected to the pressure-sensitive conductive rubber 11(31).

Thereby, connecting the lead 12(32) with a control circuit 25 of a charging circuit, so that the control circuit 25 can cut the charging current immediately by operation of a switching circuit 27 when the inner pressure of the battery exceeds a predetermined value input in the control circuit 25. Therefore, the seal type storage battery 20, connected with the charging circuit, can prevent overcharge.

Figure 7:
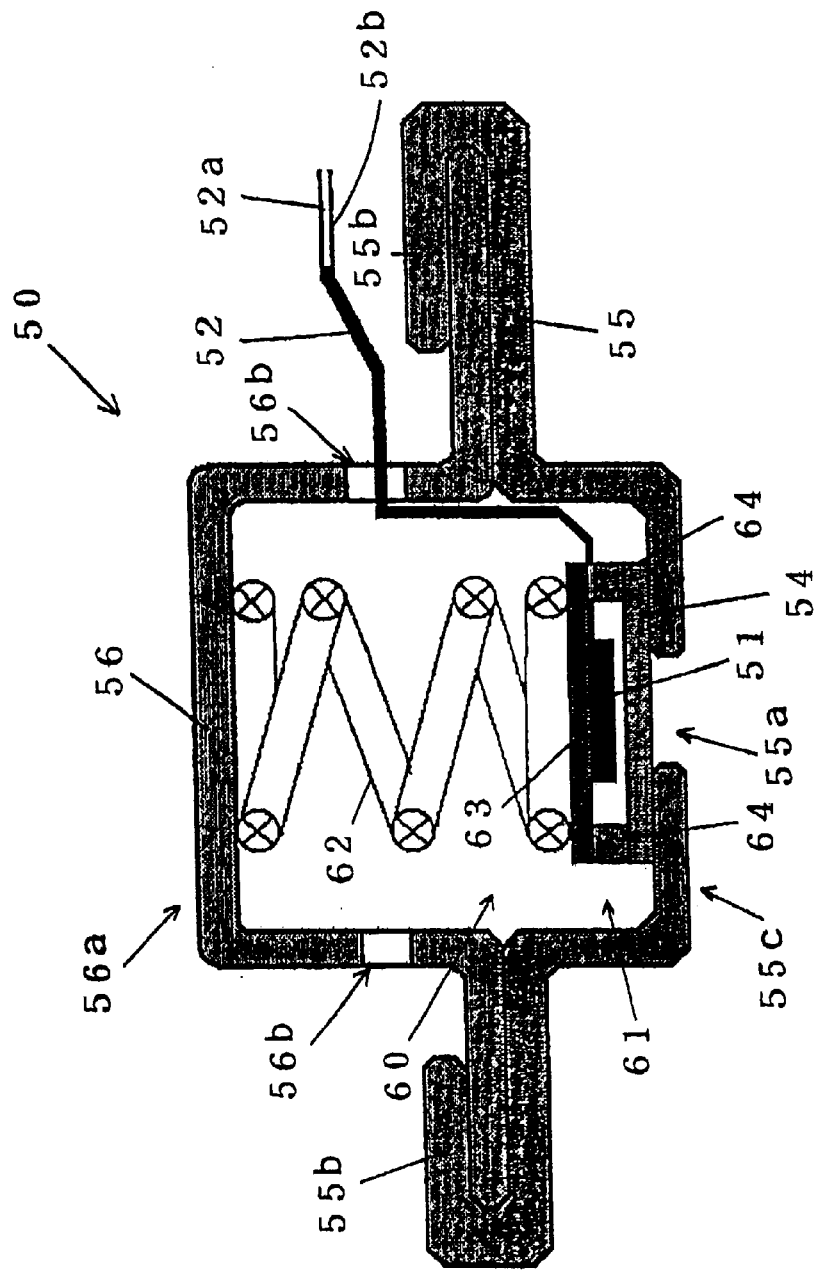
FIG. 7 shows a cross sectional view of the completed sealing equipment having the pressure-sensitive conductive rubber in accordance with another embodiment of the present invention.

Furthermore, the sealing equipment of another embodiment according to the present invention which has a pressure-sensitive conductive rubber and a pressure-regulating valve is shown in FIG. 7. The sealing equipment 50 shown in FIG. 7 has the pressure-regulating valve 60 having a valve 61 and an elastic body 62 between a sealing sheet 55 and an electrode cap 56.

The sealing sheet 55 and the electrode cap 56 are produced by pressing metal sheet. The sealing sheet 55 has a projection 55c projecting below in center, and has an open hole 55a in the center area of the lower surface of the projection 55c. The electrode cap 56 has a projection 56a projecting upward in the center area. Here, the projection 56a is a positive electrode in this electrode cap 56. In addition, the electrode cap 56 has an open pierced hole 56b in the side of the projection 56a. The pierced hole 56b serves as a port for exhausting the gas in the battery case to the outside upon operation of the pressure-regulating valve 60. Note that the lead wire 52, which is connected with the pressure-sensitive conductive rubber 51 disposed inside of the valve 61 passes to the outside through the pierced hole 56b. The sealing sheet 55 and the electrode cap 56 are laminated so as to form an interior space, and the valve 61 and the elastic body 62 are disposed in this space. In the sealing equipment 50, after disposing the valve 61 and the elastic body 62 between the sealing sheet 55 and electrode cap 56, the sealing sheet 55 and the electrode cap 56 are coupled by bending and then caulking the periphery 55b of the sealing sheet 55. Alternatively the sealing sheet 55 and the electrode cap 56 may be connected by spot-welding at their peripheral portions.

The pressure-regulating valve 60 opens when the inner pressure of the battery case is higher than the predetermined pressure to prevent the extremely high pressure from breaking the outer case. The pressure-regulating valve 60 has the valve 61 which seals the opened hole 55a of the sealing sheet 55, and the elastic body 62 which applies a force on the valve 61 in a direction toward the opened hole 55a.

Figure 8:
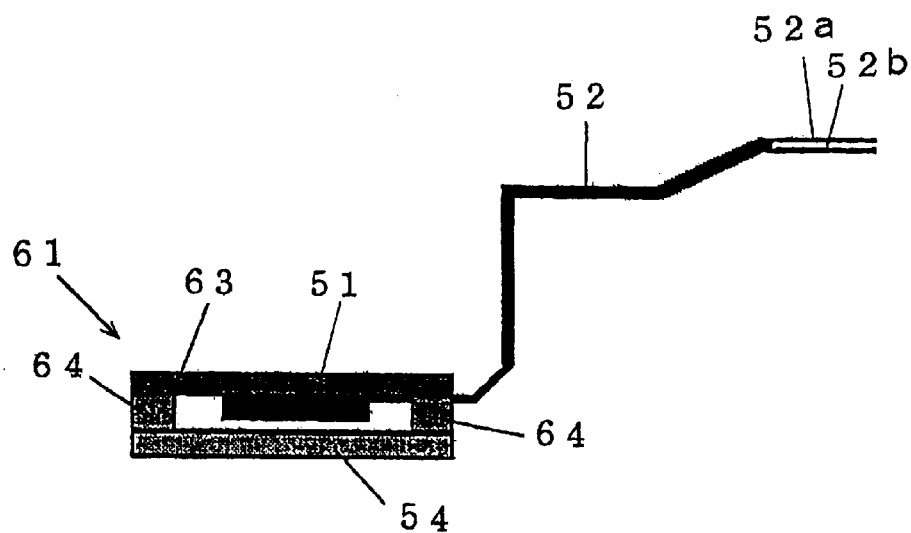
FIG. 8 shows an enlarged cross sectional view of a valve of the sealing equipment shown in FIG. 7.

As shown in the enlarged cross sectional view of FIG. 8, the pressure-sensitive conductive rubber 51 is disposed inside of the valve 61. The valve 61 shown in FIG. 8 has a sheet material 63 coupled to the lower end of the elastic body 62, a cylindrical body 64 fixed on the lower surface of the periphery of the sheet material 63, and the alkali-resisting rubber sheet 54 which is fixed on the bottom of the cylindrical body 64 and seals the bottom opening of the cylindrical body 64. The pressure-sensitive conductive rubber 51 is disposed in the space formed by the sheet material 63, the cylindrical body 64 and the alkali-resisting rubber sheet 54. In the valve 61, the pressure-sensitive conductive rubber 51 is located at a predetermined position by being fixed in the center portion of lower surface of the sheet material 63. The sheet material 63 is preferably made of hard plastic or metal sheet. This type of sheet material 63 reduces errors caused by the responsiveness of the pressure-sensitive conductive rubber 51 for the gas pressure. In addition, in the valve 61, the lead wire 52 connected with the pressure-sensitive conductive rubber 51 is extended outside of the valve 61. The lead wire 52 is pulled out through the pierced hole 56b of the electrode cap 56 to outside of the battery. As shown in FIG. 7, the valve 61 is disposed such that it seals the open hole 55a of the sealing sheet 55 and the pressure-sensitive conductive rubber 51 faces the opened hole 55a. Therefore the pressure-sensitive conductive rubber 51 can detect a rise of the inner pressure of the battery. The pressure detecting signal detected by the pressure-sensitive conductive rubber 51 is outputted via the lead wire 52.

Figure 9:
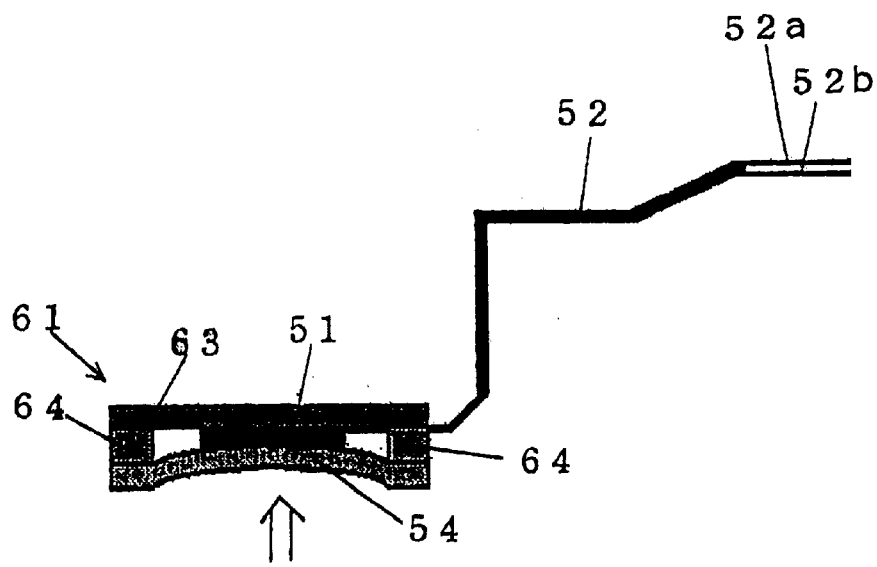
FIG. 9 shows a cross sectional view of the valve, shown in FIG. 8, under pressure.

In addition, in the valve 61 shown in FIG. 8, the inner shape of the cylindrical body 64 is larger than the outer shape of the pressure-sensitive conductive rubber 51 such that the pressure-sensitive conductive rubber 51 does not contact the cylindrical body 64. As for the valve 61, the height of the cylindrical body 64 is higher than the thickness of the alkali-resisting rubber sheet 54 so that a sufficient gap is formed between the pressure-sensitive conductive rubber 51 and the alkali-resisting rubber sheet 54. The gap between the pressure-sensitive conductive rubber 51 and the alkali-resisting rubber sheet 54 is designed to be 0–2 mm, preferably 0.2–1 mm, most preferably 0.5 mm. In valve 61, given the inner pressure of the battery rising and the alkali-resisting rubber sheet 54 compressed, as shown in FIG. 9, the alkali-resisting rubber sheet 54 is deformed and the pressure-sensitive conductive rubber 51 is compressed, and thereby the pressure is detected. In a normal battery state, the surface of the pressure-sensitive conductive rubber 51 does not contact the cylindrical body 64 or the alkali-resisting rubber sheet 54, so that the valve 61 of this structure can reliably prevent erroneous detection of the inner pressure. Also, the pressure-sensitive conductive rubber 51 may be disposed so as to contact the cylindrical body 64 or the alkali-resisting rubber sheet 54.

One end of the elastic body 62 is joined to the valve 61, the other end is joined to the bottom of the projecting portion of the electrode cap 56. The elastic body 62 impels the valve toward the opened hole 55a. The elastic body 62, shown in the figure, is a coil spring with elastic line-shaped material. The elastic body 62 is fixed to the valve 61 and the electrode cap 56 by welding or adhering. Thus the elastic body 62 disposed between the sealing sheet 55 and the electrode cap 56 holds the valve 61 in a predetermined position, and seals the opened hole 55a by pushing and compressing the valve 61 to the bottom of projection potion of the sealing sheet 55. The elastic body 62 has an optimal elastic force to permit opening of the valve 61 when the inner pressure of the battery is higher than a predetermined pressure.

Figure 10:
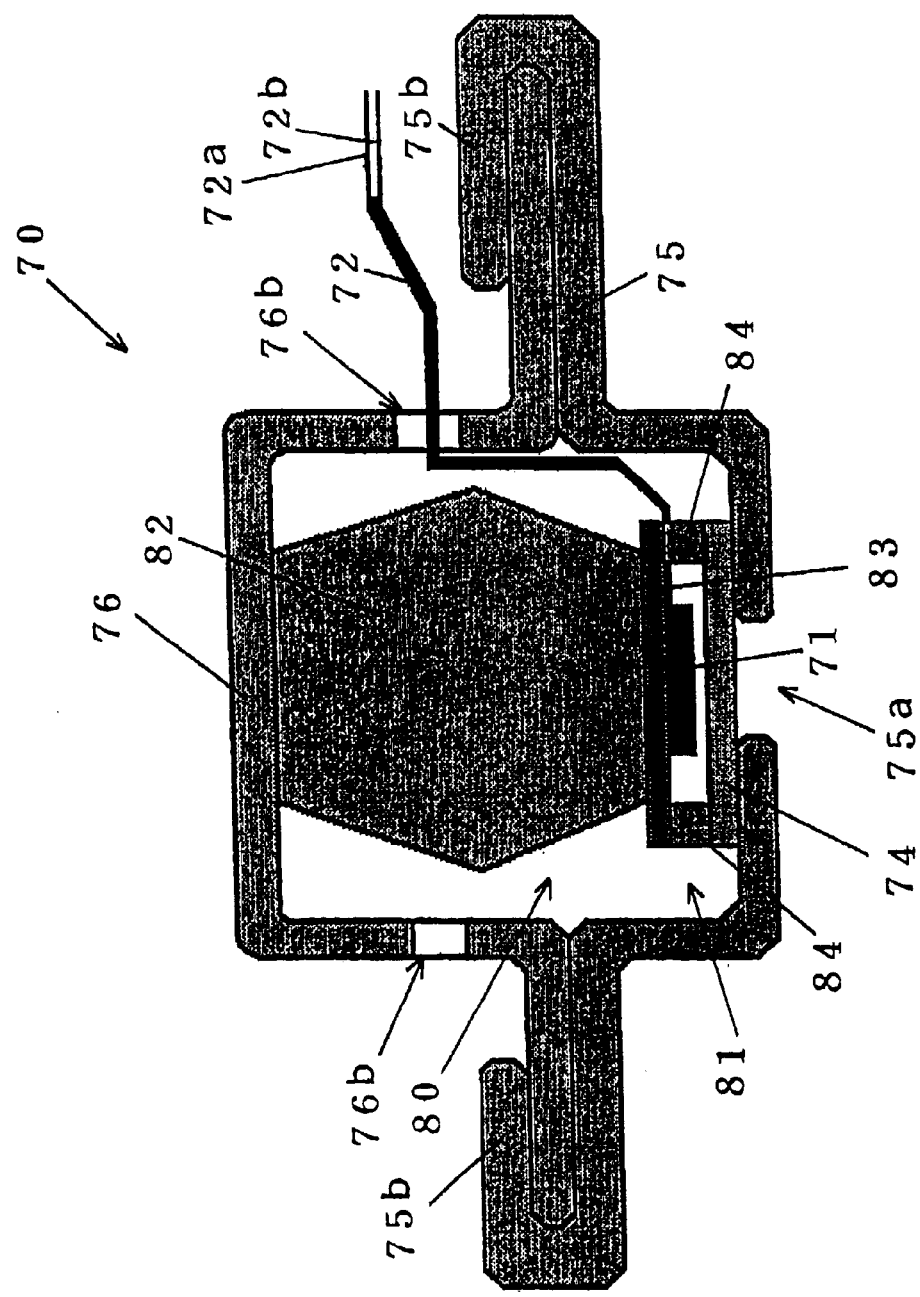
FIG. 10 shows a cross sectional view of the completed sealing equipment having the pressure-sensitive conductive rubber in accordance with another embodiment of the present invention.

In another embodiment, a rubbery elastic body comprises the elastic body as shown in FIG. 10. The sealing equipment 70 shown in FIG. 10 has a pressure-regulating valve 80, which includes a valve 81 having a pressure-sensitive conductive rubber 71 disposed inside. The elastic body 82 is disposed between the sealing sheet 75 and the electrode cap 76. In the valve 81, the pressure-sensitive conductive rubber 71 is fixed to the lower surface of sheet material 83, which is joined to the lower end of the elastic body 82, and disposed in the space formed by the sheet material 83, the cylindrical body 84 and the alkali-resisting rubber sheet 74. The valve 81 is positioned to seal the open hole 75a of the sealing sheet 75 via the elastic body 82. For example, the rubbery elastic body, which is the elastic body 82, can be fixed in a predetermined position by being adhered to the valve 81 and the electrode cap 76. The lead wire 72, connected with the pressure-sensitive conductive rubber 71, is extended through the pierced hole 76b of the electrode cap 76 to the outside of the battery, and outputs pressure detecting signal detected in the pressure-sensitive conductive rubber 71. In the sealing equipment 70, the sealing sheet 55 and the electrode cap 56 are also coupled by caulking the periphery 75b of the sealing sheet 75 by bending.

Although it is not shown, the sealing equipment shown in FIG. 7 and FIG. 10 can be attached to the open portion of the outer case after the insulative gasket is attached to the periphery of the caulked portion of the sealing sheet. Then the battery is sealed by caulking the opened edge portion of the outer case inwardly. In addition, as shown in FIG. 7 and FIG. 10, connecting the lead wire 52 (72) extended from the pierced hole 56b (76b) of the electrode cap 56 (76) is connected outside of the battery with the charge circuit (not shown). One core wire 52a (72a) of the lead wire 52 (72) is connected with the control circuit of the charge circuit, and another core wire 52b (72b) is connected to the connector of the power source and the negative electrode of the battery.

Although it is not shown, in addition, when the electrode cap be used as a negative electrode, one lead wire can be extended from the pierced hole of the electrode cap to the outside of the battery, and another core wire of the lead wire can be connected electrically in the electrode cap by welding or the like, in the sealing equipment. The seal type storage battery makes connecting work easier, because only one core wire of the lead wire should be connected with the control circuit of the charge battery.

The sealing equipment described above outputs a pressure detecting signal to the charge circuit via the lead extended to outside by detecting a rise of the inner pressure of the battery by the pressure-sensitive conductive rubber disposed inside of the valve. The control circuit of the charge circuit then cuts the charge current to prevent overcharge in the seal type storage battery, when the inner pressure of the battery becomes higher than a predetermined pressure. In addition, the sealing equipment prevents the inner pressure of the battery to become extremely high with the pressure-regulating valve opening the valve, even the control circuit does not cut the charge current in some situations when the inner pressure is higher than the predetermined pressure. Therefore, predetermined pressure with the pressure-regulating valve opening is set higher than the predetermined pressure with the control circuit cutting the charge current.

States of the battery attached with the sealing equipment described above, in which the charge current is cut by the pressure detecting signal from the pressure-sensitive conductive rubber and the gas is exhausted by the pressure-regulating valve by opening the valve, was experimented below

EXAMPLE 1

The batteries A–D (500 mAh) having the sealing equipment shown in FIG. 7 were produced. The inner pressures for stopping charging in response to the pressure detecting signal detected by the pressure-sensitive conducting rubber were set at 0.6 MPa, 0.8 MPa, 1.0 MPa and 1.2 MPa respectively. In addition, in the batteries A–D, the inner pressure to operate the pressure-regulating valve was set at 1.5 MPa. These batteries were charged with the charge current 10 A. The charge current of all batteries A–D were cut when the inner pressure of the batteries reached the predetermined pressures, which were 0.6 MPa, 0.8 MPa, 1.0 MPa and 1.2 MPa respectively.

EXAMPLE 2

Next, in the batteries A–D, the control circuit, which stops charging in response to the pressure detecting signal detected by the pressure-sensitive conducting rubber, was turned off, and these batteries A–D were charged with the charge current 10 A. It was confirmed that the gas was exhausted by the pressure-regulating valve by opening the valve, when the inner pressure became 1.5 MPa or over 1.5 MPa.

Here, in the embodiments described above, although the present invention is explained to apply to the nickel-cadmium storage batteries, this invention can also apply to a nickel metal hydride seal type storage battery or the like.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds, are therefore intended to be embraced by the claims.

What is claimed is:

1. A seal type storage battery comprising:
   an outer battery case holding an electricity generating element and having an open end portion; and
   a sealing assembly sealing the open end portion of the outer battery case, the sealing assembly comprising a pressure-sensitive conductive rubber member and a lead connected to the pressure-sensitive conductive rubber member, said pressure-sensitive conductive rubber member being disposed in the outer battery case, and having a resistance that changes continuously in response to a rise of pressure in the outer battery case, the lead extending from the pressure-sensitive conductive rubber member to outside of the outer battery case, wherein the lead is capable of outputting a pressure detecting signal.

2. The seal type storage battery as claimed in claim 1, wherein the pressure-sensitive conductive rubber member is mainly formed of a pressure-sensitive material whose resistivity decreases in response to increasing pressure applied thereto.

3. The seal type storage battery as claimed in claim 1, wherein the lead attached to the pressure-sensitive rubber member is connected to a negative electrode.

4. The seal type storage battery as claimed in claim 1, wherein the lead attached to the pressure-sensitive rubber member is connected to a positive electrode.

5. The seal type storage battery as claimed in claim 1, wherein the sealing assembly comprises a sealing sheet having an open hole portion in a center portion thereof, and an electrode cap having an outer terminal fixed on an outer surface of the sealing sheet, and wherein the pressure-sensitive rubber member is disposed between the sealing sheet and the electrode cap.

6. The seal type storage battery as claimed in claim 5, wherein the sealing assembly further comprises a rubber sheet disposed on the sealing sheet so as to airtightly seal the open hole portion of the sealing sheet, wherein the pressure-sensitive rubber member is located between the rubber sheet and the electrode cap.

7. The seal type storage battery as claimed in claim 6, wherein the rubber sheet is an alkali-resisting rubber sheet.

8. The seal type storage battery as claimed in claim 7, wherein the rubber sheet is formed of ethylene-propylene diethylene rubber.

9. The seal type storage battery as claimed in claim 5, further comprising an insulative gasket interposed between the sealing sheet and the open portion of the outer battery case.

10. The seal type storage battery as claimed in claim 1, wherein the seal type battery is a nickel-cadmium battery.

11. The seal type storage battery as claimed in claim 1, wherein the seal type battery is a nickel metal hydride battery.

12. The seal type storage battery as claimed in claim 1, wherein the sealing assembly comprises:

a sealing sheet having an open hole portion in a center thereof;

an electrode cap having an outer terminal fixed on an outer surface of the sealing sheet;

a pressure-regulating valve assembly disposed between the sealing sheet and the electrode cap, the pressure-regulating valve assembly having a valve for sealing the open hole portion of the sealing sheet; and an elastic body biasing the valve toward the open hole portion of the sealing sheet, wherein the pressure-sensitive conductive rubber member is aligned with the open hole portion of the sealing sheet.

13. The seal type storage battery as claimed in claim 12, wherein the valve comprises:

a sheet of material that is joined to the elastic body;

a cylindrical body fixed to a lower surface of the sheet of material; and a rubber sheet fixed to a lower surface of the cylindrical body, wherein the pressure-sensitive conductive rubber member is disposed in a space formed by the sheet of material, the cylindrical body and the rubber sheet.

14. The seal type storage battery as claimed in claim 13, wherein the pressure-sensitive conductive rubber member is disposed so that a gap is formed between the rubber sheet and a surface of the pressure-sensitive conductive rubber member.

15. The seal type storage battery as claimed in claim 13, wherein the rubber sheet is an alkali-resisting rubber sheet.

16. The seal type storage battery as claimed in claim 15, wherein the rubber sheet is formed of ethylene-propylene diethylene rubber.

17. The seal type storage battery as claimed in claim 12, wherein the elastic body is a coil spring.

18. The seal type storage battery as claimed in claim 12, wherein the elastic body is a rubbery elastic body.

19. The seal type storage battery according to claim 12, wherein the as sealing sheet seals the open portion of the outer case via an insulative gasket.

20. A seal type storage battery comprising:

an outer battery case holding an electricity generating element; and a sealing assembly disposed in a bottom portion of the outer battery case, the sealing assembly comprising a pressure-sensitive conductive rubber member and a lead connected to the pressure-sensitive conductive rubber member, the pressure-sensitive conductive rubber member being disposed in the outer battery case, and having a resistance that changes continuously in response to a rise of pressure in the outer battery case, the lead extending from the pressure-sensitive conductive rubber member to outside of the outer battery case, wherein said lead is capable of outputting a pressure detecting signal indicative of the pressure in the outer battery case.

21. The seal type storage battery as claimed in claim 20, further comprising a sealing structure disposed in an open portion of the outer battery case, the sealing structure having a pressure-regulating valve.

* * * * *